Dec. 19, 1939.  E. C. KLATTIE  2,184,165
ORNAMENTING MACHINE
Filed Oct. 24, 1938  2 Sheets-Sheet 2

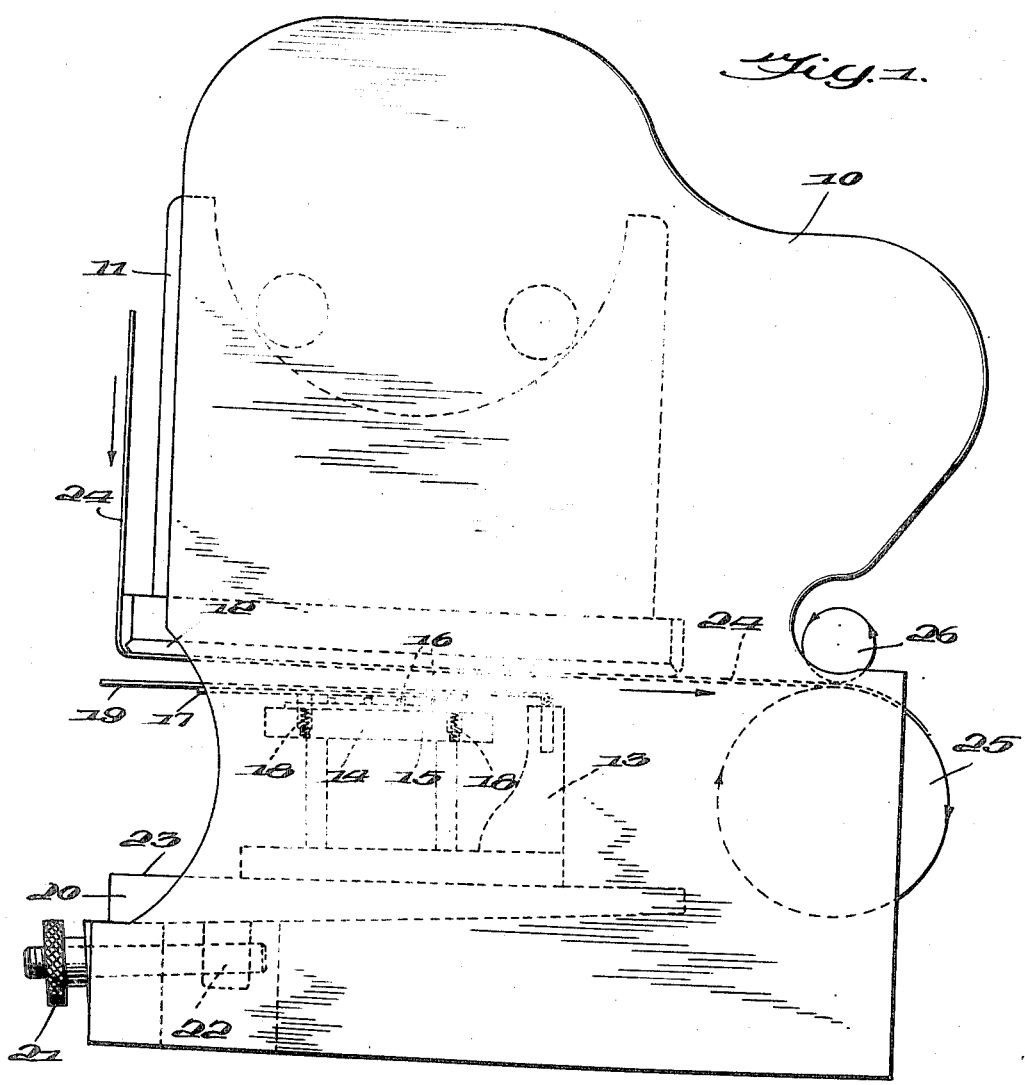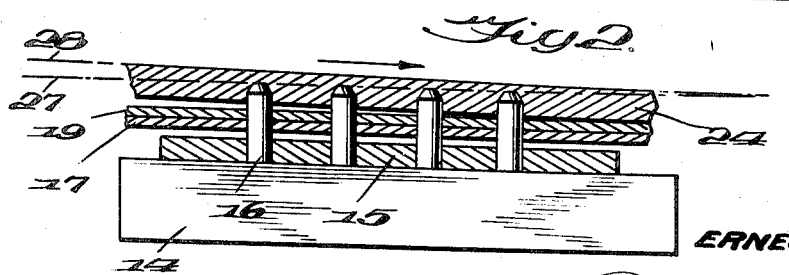

Inventor
ERNEST C. KLATTIE,
By Riordon & Riordon
Attorneys

Patented Dec. 19, 1939

2,184,165

UNITED STATES PATENT OFFICE 2,184,165

ORNAMENTING MACHINE

Ernest C. Klattie, Cincinnati, Ohio, assignor to The Louis G. Freeman Company, Cincinnati, Ohio, a corporation of Ohio Application October 24, 1938, Serial No. 236,763

19 Claims. (Cl. 164—93)

This invention relates to cutout and perforating presses in which the cutting edges of a die are caused, under the influence of pressure, to penetrate a work-piece and partially enter a backing medium on the opposite side of the work.

More particularly, the invention relates to machines for use in the manufacture of boots and shoes, wherein the work is ornamented by perforating or cutting out a design therein, and it is equally applicable to combined marking and cutting machines adapted for operations upon skins, upper blanks, fitted or closed uppers, and the like, in which the work is marked or printed with ink, pigment, or its equivalent, at the same time, or as part of a cycle of operations, during which the work is perforated.

Machines of this nature comprise a die, a reaction member or cutting block, and pressure means for effecting a relative movement between the die and cutting block, the work being supported between the two. The pressure member may be a plunger to which the die is secured for movement into and out of operating relation to the work, or it may be a plunger upon which the work is supported and moved to the die, or the cutting block itself may be movable toward and from the die, but it is contemplated that the present invention is applicable to all machines of this general nature, regardless of the specific mode of operation.

It is customary to provide a backing medium, usually an intermittently fed web of paper, at the opposite side of the work from the cutting edges, the primary purpose of the backing medium being to insure a clean, sharp cut, with the cutting edges completely penetrating the work and partially penetrating this backing medium. It is not essential that the backing medium be an intermittently fed web of paper, as it may take other forms, but the use of such a web is desirable in order that clean, fresh surfaces may be presented constantly to the die, and thereby insuring uniform work. For purposes of illustration, a web of backing paper is shown and described herein.

The cutting block which, of course, is on the opposite side of the backing medium from the work and cutting edges of the die, is usually surfaced with a material softer than the cutting edges, such as brass or fibre, to protect the cutting edges in the event that the backing medium is inadvertently perforated completely through.

In the present day use of these machines, after a cut has been made, the web is fed a brief distance sufficient to present a fresh surface to the die, and when a roll of material has been completely used, it may be reversed, and the other side used. The distance which the backing material is fed for each cutting operation will vary with the style or pattern of die, but will usually approximate the spread of the die, to insure fresh cutting surfaces.

Furthermore, there are limitations to the length and time of feed, and it has been found that as the feed increases beyond a certain point, e. g. in the case of large dies mounting a great number of tubes, there is a tendency towards poorer work, with perforations which are not as clean cut as in the case of smaller dies requiring only a short quick feed.

Accordingly, primary objects of the instant invention are to make it possible to obtain uniform, clean cut work with all dies, and to substantially reduce the paper feed from the requirements of present practice, thereby effecting a material saving of expense, as well as time of operation.

To this end, the invention contemplates a machine so constructed and arranged that there is a slight angle between the plane of the cutting edges of the die and the plane of the reaction member or cutting block, and while this angle may be very slight, it will be enough to cause the cutting edges to penetrate the backing medium to a slightly greater depth at one side of the die than at the other, with the deepest cut at the point where the backing medium is fed away from the die, whereupon as previous cuts of lesser depth are encountered by the die, the effect will be as though a fresh surface is presented. With such an arrangement, it is only necessary to feed the paper a very slight distance, sufficient to remove the deepest cut beyond the operating area, and on the next cutting stroke, it is immaterial whether or not the cutters hit a previously formed cut in the backing paper, since they will bite deeper than any such previous cut remaining in the area.

This means that the die may punch on the paper over a substantial area, many times as the paper is being fed, but the tubes or cutting edges would be sinking deeper into the paper than any previous cut in that area.

There are a number of ways in which this result may be obtained, and it is another object to construct the machine without increasing either the cost thereof, or the cost of dies.

A further object is to reduce the amount of pressure normally required to perforate the work.

It is preferable to provide the structure with a permanent angularity, but another object contemplates the provision of means for varying or adjusting the angular relation, if same be found desirable.

To the attainment of the foregoing and other objects which will appear as the description proceeds, reference may be made to the accompanying drawings, in which:

Fig. 1 is a side elevation of one style of machine embodying the invention;

Fig. 2 is an enlarged elevation, partly in section, showing the angular penetration of the backing material with said machine;

Figure 3:
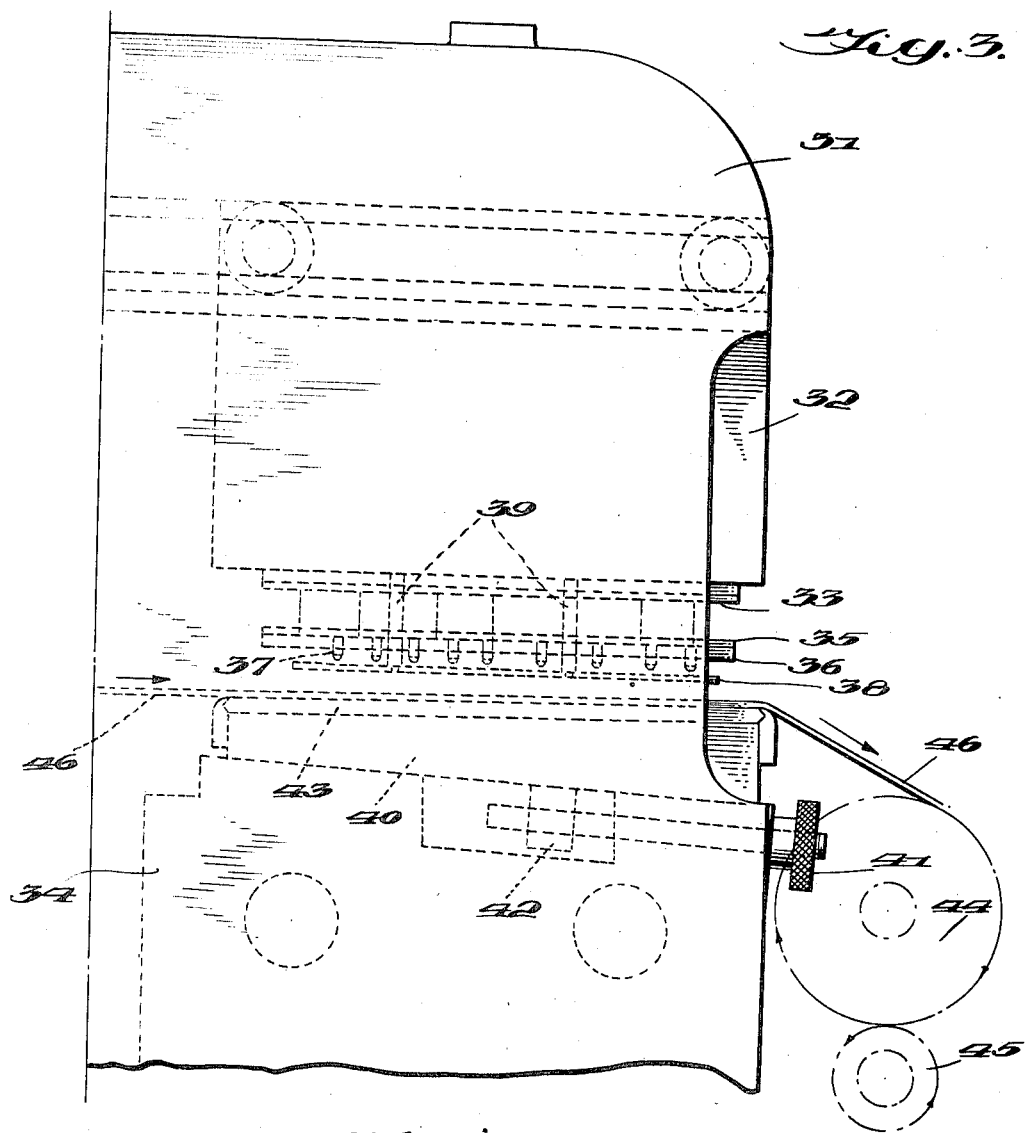
Fig. 3 is a fragmentary elevation of a different style of machine embodying the invention.

In some machines the feed of paper may be from front to back, as shown in Fig. 1, whereas in others, it may be from back to front, as illustrated in Fig. 3, or it may even be laterally, from side to side of the machine, but regardless of the direction of paper feed, the closest point between the die and cutting blocks, i. e. the apex of the angle between the planes of the cutting edges and cutting surface, will be at that point where the paper leaves the operating area of the die. Thus in Figs. 1 and 2, the apex of the angle will be toward the rear of the machine, whereas in Figs. 3 and 4, the apex will be at the front of the machine.

Referring now more specifically to the drawings, wherein like reference numerals designate like parts, and considering first Figs. 1 and 2, the invention is shown applied to a well known type of cutout machine, of which the patents to Benjamin W. Freeman, Nos. Re. 20,203, dated December 8, 1936 and 1,722,133, dated July 23, 1929 are examples, and to which reference may be made for machine details, such as supply and take-up rolls for the backing material. This machine comprises generally, a frame 10, a vertically reciprocable, pressure applying plunger 11 which functions as the cutting block, having a cutting surface or face plate 12 of brass or other suitable material softer than the cutting edges of the die. The die 13 is provided with a die block 14 carrying a tube plate 15 in which are supported perforating tubes 16. The usual stripper plate 17 is resiliently mounted in the die block, as indicated by the yieldable supports 18, in a conventional manner. A gauge mask 19, for accurately positioning and holding the work with respect to the cutting edges of the die, is hinged to the die, and extends across the stripper. It will be understood, of course, that the work is supported by the stripper plate 17, beneath the mask 19, and held in position therebetween, in a conventional manner.

The die 13 is supported in the machine on a wedge 20, said die being slidable from the position shown, beneath the plunger 11, to a forward or inoperative position where the operator may apply the work under the gauge mask. The wedge 20 is adjustable by means of a thumb screw 21 and a connection 22, and it will be obvious that adjustment of the wedge will have the effect of raising and lowering the operating position of the die with respect to the plunger 11.

In accordance with the present invention, however, the supporting surface 23 for the die, instead of being parallel to the horizontally disposed face plate 12 of the plunger 11, is ground off or otherwise formed at an angle to the plunger face, the highest point of the surface 23 being at the rear of the machine, and sloping off slightly toward the front of the machine, whereupon when the die is beneath the plunger, the plane of the cutting edges will be angularly disposed to the plane of the plunger face.

The paper web 24 which forms a backing material for the cutters or tubes is fed from the front of the machine to the rear thereof by means of feed rolls 25 and 26, and hence the point where the die is closest to the web is against the leaving point of the web, as the web is fed past the die.

This angular relation between the die and backing material is shown, somewhat exaggerated in Fig. 2, and it can be seen clearly that the plane 27 of the cutting edges of the tubes 16 is angularly disposed to the horizontal plane 28 of the backing material 24, which plane is of course, that of the face plate 12.

Figure 4:
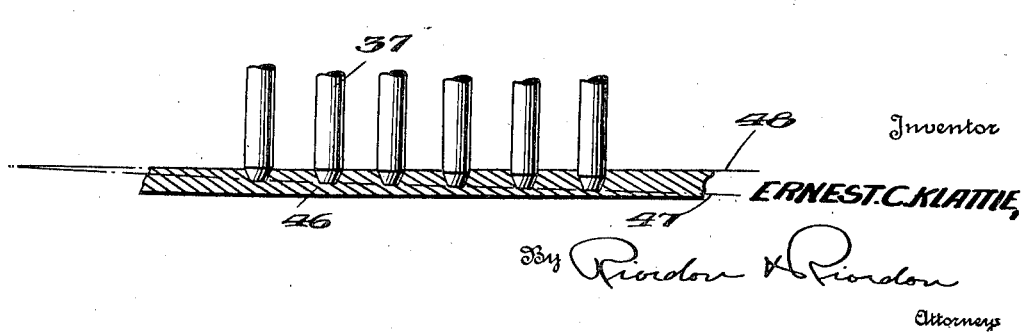
Fig. 4 is an enlarged fragmentary elevation, partly in section, illustrating the angular penetration in a machine of the style shown in Fig. 3, this view being reversed when compared to Fig. 3.

Referring now to Figs. 3 and 4, the invention is shown applied to a machine of the type described and claimed in the patent to Benjamin W. Freeman et al., No. Re. 20,294, dated March 16, 1937, to which reference may be made for a more complete description of the machine. This particular machine is designed to apply a printed marking to the work as part of a single machine operation in which the work also is perforated or cut out.

This machine comprises the frame 31, a die carriage 32 upon which is mounted the die 33, and a vertically reciprocable work supporting plunger 34. The die in this instance includes a die block 35, a tube plate 36, and the usual perforating tubes 37, by means of which the work is ornamented. A stripper plate 38, which may be provided with marking ribs or ornamenting protuberances (not shown) in a conventional manner, is carried by stripper studs 39, through which stripping pressures are transmitted to the plate 38.

The die carriage 32, together with the die assembly, is slidable into and out of its operating position to enable the operator to properly place the work on the plunger 34, a suitable work plate and gauge being conventionally provided for the purpose.

The plunger 34 is surmounted by a wedge 40 having an adjusting screw 41, connected at 42 to the wedge, whereby to increase or decrease the effective height of the plunger with respect to the die. The wedge 40 may have a face plate 43 of material softer than the cutting edges of the tubes 37. Feed rolls 44 and 45 are effective to provide an intermittent feed for the web 46 of backing material, but it will be noted that in this machine, the feed is from back to front, or just the reverse to the direction of feed shown in Fig. 1.

In this form, the plane 47 of the cutting edges will be horizontal, and the upper surface of the wedge 40, together with the operating surface 43, will be inclined such that the plane 48 of the paper and face plate 43 will form an angle with the plane 47 of the tube edges, the apex of the angle being at the forward part of the machine, where the paper web leaves the operating area.

In both illustrated forms of the invention then, the cutting edges of the die will enter the backing material at an angle, and thus two distinct results are obtained. First, of course, penetration of the tubes is progressively less from the leaving point of the web, whereupon as the paper is fed, no matter how slightly, away from the tubes, successive cuts will always be deeper than previously formed perforations at the same point of die operation. Secondly, since the cutters enter the backing paper at an angle, with a shear action, less pressure is required than would be the case of a truly normal penetration.

There are many ways in which these results might be obtained, and accordingly the disclosures herein are intended as illustrative, rather than as limiting. For example, it is not essential that the wedge itself be provided with a tapered or sloping surface. The surface of the plunger might be sloping, or the die base might be similarly treated. For that matter, the brass operating surface 12 or 43 might be made wedge-shaped, and many other modifications within the scope of the invention may occur to those skilled in the art. In fact the style of machine to which the invention is applied may require some variation, and there are many different machines on the market.

Having thus described my invention, what I claim and desire to secure by Letters Patent of the United States, is:

1. A perforating machine comprising a die having perforating edges in a common plane, and a laterally movable reaction or cutting surface opposed thereto, the plane of the perforating edges of the die, and the plane of the cutting surface being disposed in converging relation to each other, in the direction of movement of said surface.

2. A perforating machine comprising a die having perforating edges, a reaction or cutting surface opposed thereto, and a laterally movable backing medium interposed therebetween, the planes of the perforating edges of the die, and of the cutting surface being disposed in converging relation to each other, in the direction of movement of said medium, whereby upon relative movement between said edges and said surface toward each other, the edges will partially penetrate the backing medium at an angle to its surface, and means to produce relative movement between said edges and said cutting surface.

3. A perforating machine comprising a die having perforating edges, a reaction or cutting surface opposed thereto, and a laterally movable backing medium interposed therebetween, the planes of the perforating edges of the die, and of the cutting surface being disposed in converging relation to each other, whereby upon relative movement between said edges and said surface, the edges will partially penetrate the backing medium to progressively different depths, and means to produce relative movement between said edges and said cutting surface.

4. A perforating machine comprising a die having a plurality of cutting edges disposed in spaced relation to each other across the die, a reaction or cutting surface opposed to said cutting edges, a laterally movable backing medium interposed between said edges and surface, the planes of the cutting edges and of the cutting surface being disposed in converging relation to each other, in the direction of movement of said medium, whereby upon relative movement between the cutting edges and the cutting surface toward each other, the cutting edges will partially penetrate the backing medium to progressively different depths across the cutting area, and means to produce relative movement between said edges and said cutting surface.

5. A perforating machine comprising a die having a plurality of cutting edges disposed in spaced relation to each other across the die, a reaction or cutting surface opposed to said cutting edges, a backing medium interposed between said edges and surface, the plane of the cutting edges being substantially horizontally disposed, and the plane of the cutting surface being disposed at an angle thereto and sloping slightly from one side of the die to the other, whereby upon relative movement between the cutting edges and the cutting surface, the cutting edges will partially penetrate the backing medium to progressively different depths across the cutting area, and means to produce relative movement between said edges and said cutting surface.

6. A perforating machine comprising a die having a plurality of cutting edges disposed in spaced relation to each other across the die, a reaction or cutting surface opposed to said cutting edges, a laterally movable backing medium interposed between said edges and surface, the plane of the cutting surface being substantially horizontally disposed and the plane of the cutting edges being disposed at an angle thereto and sloping slightly from one side of the cutting surface to the other, in the direction of movement of said medium, whereby upon relative movement between the cutting edges and the cutting surface toward each other, the cutting edges will partially penetrate the backing medium to progressively different depths across the cutting area, and means to produce relative movement between said edges and said cutting surface.

7. A perforating machine comprising a die having a plurality of cutting edges disposed in spaced relation to each other across the die, a reaction or cutting surface opposed to said cutting edges, a backing medium interposed between said edges and said surface, the planes of the cutting edges and of the cutting surface being relatively disposed in converging relation to each other, whereby upon relative movement between the cutting edges and the cutting surface, the cutting edges will partially penetrate the backing medium to progressively different depths across the cutting area, means to feed the backing medium intermittently across the cutting surface to present fresh backing surfaces to the cutting edges, and means to produce relative movement between said edges and said cutting surface.

8. A perforating machine comprising a die having a plurality of cutting edges disposed in spaced relation to each other across the die, a reaction or cutting surface opposed to said cutting edges, a backing medium interposed between said edges and said surface, the planes of the cutting edges and of the cutting surface being relatively disposed in converging relation to each other, whereby upon relative movement between the cutting edges and the cutting surface, the cutting edges will partially penetrate the backing medium to progressively different depths across the cutting area, means to feed the backing medium intermittently in a direction toward the apex of the angle formed by said converging planes, and means to produce relative movement between said edges and said cutting surface.

9. A perforating machine comprising a die having a plurality of cutting edges disposed in spaced relation to each other across the die, stripping means for said cutting edges normally positioned in slightly advanced relation to said edges, a reaction or cutting surface opposed to said cutting edges, a backing medium interposed between said edges and surface, means to produce a relative movement between said edges and said cutting surface whereby said cutting edges will partially penetrate the backing medium, and means to effect such penetration to progressively different depths into the backing medium across the cutting area.

10. A perforating machine comprising a combined cutting and marking die having a plurality of cutting edges disposed in spaced relation to each other across the die, a reaction or cutting surface opposed to said cutting edges, a backing medium interposed between said edges and surface, means to produce a relative movement between said edges and said cutting surface whereby said cutting edges will partially penetrate the backing medium, and means to effect such penetration to progressively different depths into the backing medium across the cutting area.

11. A perforating machine comprising a die having a plurality of cutting edges disposed in spaced relation to each other across the die, a reaction or cutting surface opposed to said cutting edges, a backing medium interposed between said edges and said surface, the planes of the cutting edges and of the cutting surface being relatively disposed in converging relation to each other, and converging toward the rear of the machine whereby upon relative movement between the cutting edges and the cutting surface, the cutting edges at the rear of the die will penetrate the backing medium to a greater depth than the cutting edges on the forward portion of the die, means to feed the backing medium intermittently from front to rear of the machine across the cutting surface to remove the deepest cut and to present fresh backing surfaces to the cutting edges, and means to produce relative movement between said edges and said cutting surface.

12. A perforating machine comprising a die having a plurality of cutting edges disposed in spaced relation to each other across the die, a reaction or cutting surface opposed to said cutting edges, a backing medium interposed between said edges and said surface, the planes of the cutting edges and of the cutting surface being relatively disposed in converging relation to each other, and converging toward the front of the machine whereby upon relative movement between the cutting edges and the cutting surface, the cutting edges at the front of the die will penetrate the backing medium to a greater depth than the cutting edges on the rear portion of the die, means to feed the backing medium intermittently from back to front of the machine across the cutting surface to remove the deepest cut and to present fresh backing surfaces to the cutting edges, and means to produce relative movement between said edges and said cutting surface.

13. The method of perforating work which comprises supporting the work adjacent a laterally movable backing medium and applying a perforating die to the work at the side opposite said medium and at an angle to the plane of the backing medium, with the apex of the angle extending in the direction of movement of said medium.

14. The method of perforating work which comprises supporting the work adjacent a backing medium, applying a perforating die to the work at the side opposite said medium and at an angle to the plane of the backing medium, perforating the work, and penetrating the backing medium through the work to progressively different depths across the cutting area.

15. The method of perforating work which comprises supporting the work adjacent a backing medium, applying a perforating die to the work at the side opposite said medium and at an angle to the plane of the backing medium, perforating the work, penetrating the backing medium through the work to progressively different depths across the cutting area, and thereafter moving the backing medium laterally of the die, to present fresh backing surfaces to the die.

16. The method of perforating work which comprises supporting the work adjacent a backing medium, applying a perforating die to the work at the side opposite said medium and at an angle to the plane of the backing medium, perforating the work, penetrating the backing medium through the work to progressively different depths across the cutting area, and thereafter moving the backing medium laterally of the die in a direction effective to remove the deepest cut from the cutting area and to present fresh backing surfaces to the die.

17. The method of perforating work which comprises supporting the work adjacent a backing medium, disposing the plane of a plurality of cutting edges and the plane of the work to be perforated in converging relation to each other and engaging the cutting edges and the work under pressure, whereby the cutting edges perforate the work and enter the backing medium to progressively different depths.

18. The method of perforating work which comprises supporting the work adjacent a backing medium, applying the cutting edges of a perforating die in successive order to the work, perforating the work, and penetrating the backing medium to progressively different depths across the cutting area.

19. The method of perforating work which comprises supporting the work adjacent a backing medium, applying the cutting edges of a perforating die in successive order to the work perforating the work, penetrating the backing medium to progressively different depths across the cutting area, and thereafter moving the backing medium laterally of the die in a direction effective to remove the deepest cut from the cutting area and to present fresh backing surfaces to the die.

ERNEST C. KLATTIE.